United States Patent [19]
Citrin

[11] 3,938,402
[45] Feb. 17, 1976

[54] MANIPULATOR
[75] Inventor: Paul Citrin, Danbury, Conn.
[73] Assignee: Eastman Kodak Company, Rochester, N.Y.
[22] Filed: Aug. 14, 1974
[21] Appl. No.: 497,308

[52] U.S. Cl. .............................. 74/491; 74/471 XY
[51] Int. Cl.² .......................................... G05G 7/10
[58] Field of Search ...................... 74/471 XY, 491

[56] References Cited
UNITED STATES PATENTS

| | | | |
|---|---|---|---|
| 3,188,879 | 6/1965 | Conley | 74/491 X |
| 3,396,598 | 8/1968 | Grispo | 74/471 XY X |
| 3,768,331 | 10/1973 | Christy | 74/491 |
| 3,783,707 | 1/1974 | Foederer et al. | 74/491 X |

Primary Examiner—Allan D. Herrmann
Attorney, Agent, or Firm—A. H. Rosenstein

[57] ABSTRACT

A manipulator is described for moving a platform in translation in a plane. An actuator is mounted for rotation about an axis aligned parallel with the plane. A manual control lever is pivotly supported by the actuator which engages the platform through a similarly pivotly mounted coupling device. The coupling device engages the platform through a universal sliding movement in a slot to enable pivot motions from the control lever to produce translational position changes of the platform. Low frictional engagements of the moving elements together with a selectable motion reduction enable minutely accurate manual positioning of the platform.

14 Claims, 6 Drawing Figures

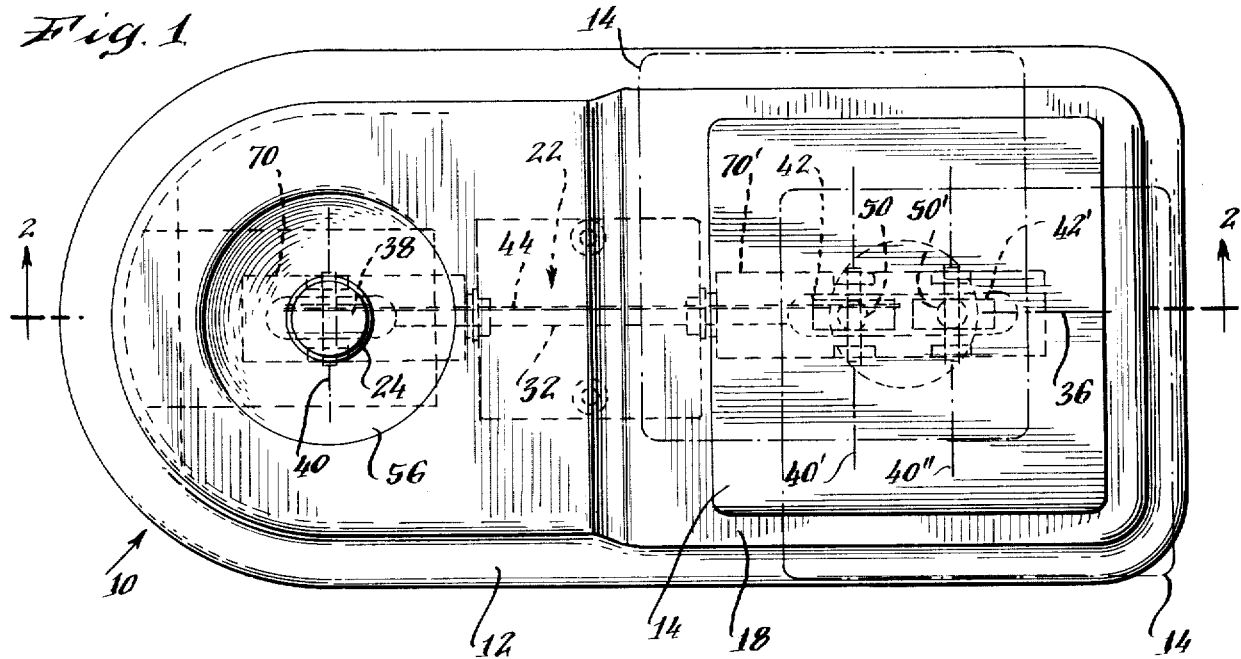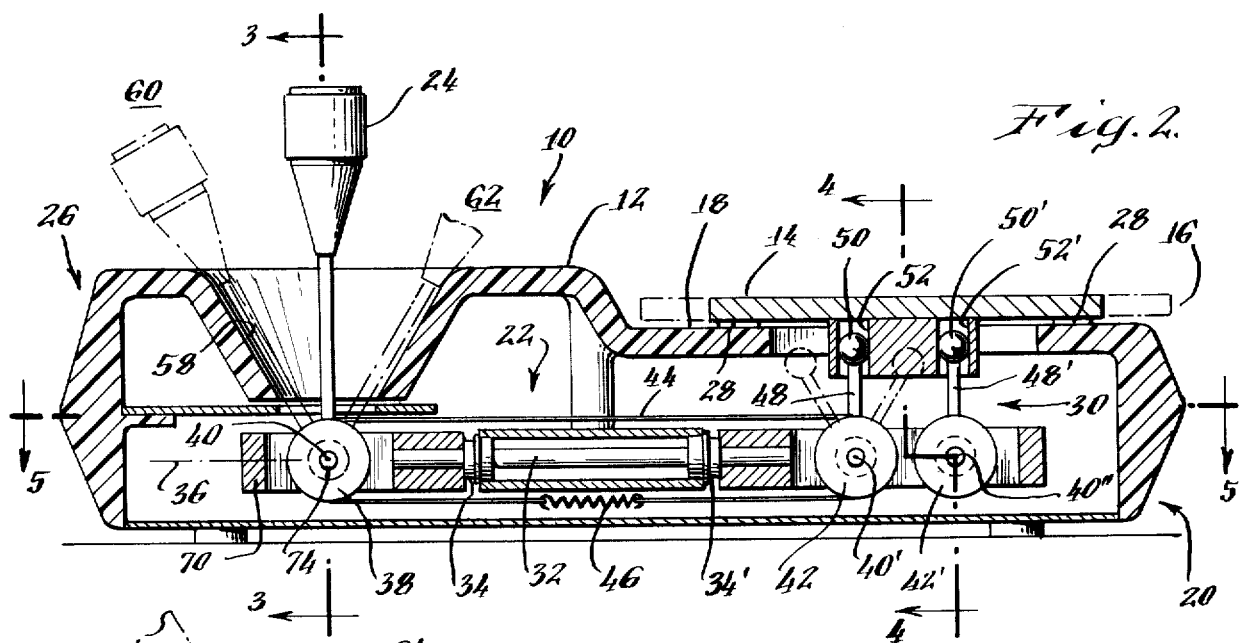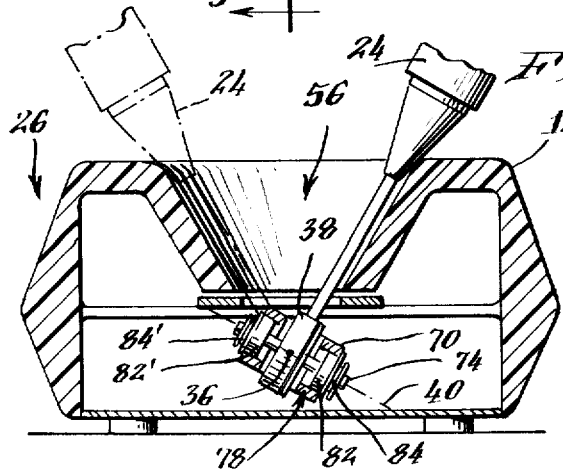

3,938,402

MANIPULATOR

FIELD OF THE INVENTION

This invention relates to a manipulator. More specifically this invention relates to an apparatus for moving a platform to minutely definable positions.

BACKGROUND OF THE INVENTION

Mechanical manipulators, also known as alignment devices, have been extensively described in the prior art. Note, for example, the U.S. Patent to Conley 3,188,879. In Conley a micromanipulator is described wherein a longitudinal control bar, coupled to a control lever, is disposed above a base plate to manipulate a specimen plate mounted on the base plate. The control bar is supported by a pair of spherical bearings to allow pins, which are affixed to the bar, to produce translational movement of the specimen plate. The actuations of the control lever are reduced to smaller motions of the specimen plate to achieve accurate specimen plate positional control.

In the U.S. Patent to Mladjan 3,204,584 a micropositioner is shown utilizing a double spherical bearing structure. In the U.S. Patent to Grispo 3,396,598 a micropositioner is described using linear slides to achieve the motion of a platform. The structure described in the Grispo reference is relatively complex to achieve the desired platform position control.

The mechanical alignment device described in the U.S. Patent to Zurcher 3,504,566 is a manipulator utilizing a ball and socket joint for achieving translational movements of a platform in a plane while a pulley arrangement provides rotation of the platform. A similar concept is shown and described in the U.S. Patent to Christy 3,768,331. A manipulator for control of a platform located in a vacuum is described in the U.S. Patent to Longamore 3,790,155.

SUMMARY OF THE INVENTION

In a manipulator in accordance with the invention, a convenient and simple structure is employed to enable accurate and precise positional control of a platform. A micromanipulator in accordance with the invention includes a housing on which a platform is located for translational movements in a plane under control by a lever. An actuator is mounted to the housing for rotation about an actuator axis which is parallel to the plane in which the platform moves. The actuator pivotly engages the control lever to enable it to move about a coupler axis which is transverse to the actuator axis. A coupler device, which is similarly pivotly mounted to the actuator as the control lever, interconnects the actuator to the platform. The coupler device moves the platform in translation in response to pivot motions by the control lever.

As described with respect to a specific embodiment for a manipulator in accordance with the invention, the coupler device may be formed with a pair of parallel mounted coupler shafts which slidingly move along platform guide surfaces oriented transverse to the plane of motion of the platform. The coupler shafts are pivotly coupled to the actuator and one coupler shaft is connected to the control lever with a pulley arrangement. The coupler shafts may be selectively sized to obtain reduced planar motions of the platform in response to lever actuations.

With a micromanipulator in accordance with the invention, precise and accurate positioning of the platform is conveniently obtained. The structure is of simple design with parts that may be manufactured with high precision for an accurate positioning of the platform. A change in the reduction of the motions of the platform in response to lever movements can be obtained by altering the size of a coupler device operative between the platform and the actuator.

It is, therefore, an object of the invention to provide a manipulator for positioning a platform in a highly accurate manner with a practical structure of convenient design.

BRIEF DESCRIPTION OF DRAWINGS

These and other objects and advantages of a manipulator in accordance with the invention can be understood from the following description of an embodiment described in conjunction with the drawings wherein FIG. 1 is a top plan view of a manipulator in accordance with the invention;

FIG. 2 is a section view of the manipulator taken along the line 2—2 in FIG. 1;

FIG. 3 is a section view of the manipulator taken along the line 3—3 in FIG. 2;

FIG. 4 is a section view of the manipulator taken along the line 4—4 in FIG. 2;

DETAILED DESCRIPTION OF EMBODIMENT

Figure 5:
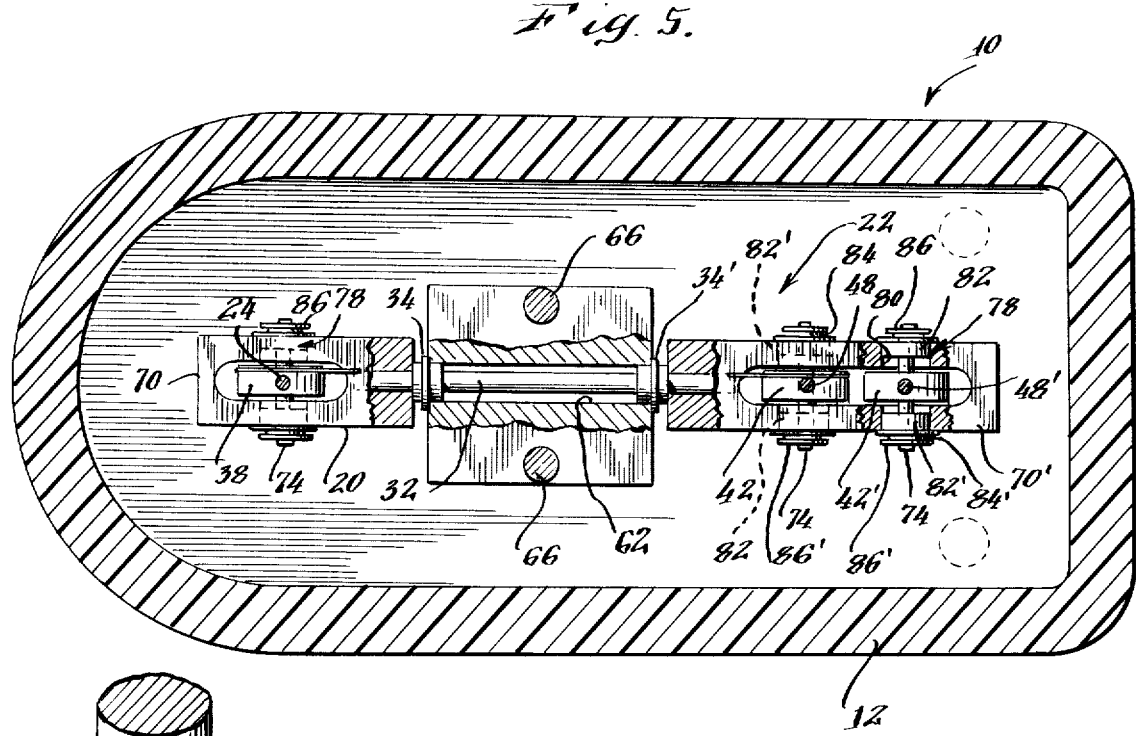
FIG. 5 is a section view of the manipulator taken along the line 5—5 in FIG. 2.

With reference to FIGS. 1-4 a manipulator 10 in accordance with the invention is illustrated. The manipulator 10 is formed with housing 12 supporting a movable platform 14 which is mounted for movement in a plane 16 over surface 18 on one side 20 of housing 12. The platform 14 is positioned with an actuator device 22 controlled with a manual lever 24 located on the other side 26 of housing 12.

The platform 14 is supported on surface 18 with a suitable low friction material layer 28 such as TEFLON being interposed for smooth travel of platform 14. As can be seen from the view in FIG. 1 with several phantom positions of the platform 14, it can be moved in translation without rotation over surface 18. Motion of platform 14 is obtained by pivoting control lever 24 which is mounted on the actuator 22. The control lever pivot motions are transformed into translational movement of platform 14 with a universal coupler mechanism 30 operative between actuator 22 and platform 14.

Actuator 22 includes an actuator shaft 32 mounted in bearings 34—34' aligned to provide actuator shaft rotation about an axis 36 which is selected generally parallel to the plane 16. Bearings 34 are of conventional design and provide a highly sensitive and accurate rotation of the actuator shaft 32 in response to corresponding pivot movements of control lever 24.

Control lever 24 is affixed to a radial bore of pulley 38 which is mounted for rotation about a lever point axis 40. Axis 40 is transverse to the rotational axis 36 of actuator shaft 32. Control lever 24, thus may be pivoted about both axes 36 and 40 as illustrated in the views of FIGS. 2 and 3.

Pulley 38 in turn is connected to a similarly mounted pulley 42 in the coupler mechanism 30 with a spring loaded cable 44 so that the pivot motions of control lever 24 about coupler axis 40 produce a like rotation of pulley 44. The spring 46 provides sufficient tension of cable 44 to assure joint rotation of pulleys 38, 42 about parallel axes 40, 40'.

Pulley 42 is connected to a coupler shaft 48 which engages a radial bore in pulley 42. Coupler shaft 48 is pressed into a radial bore of a ball 50 mounted in a guide recess 52 of platform 16. Ball 50 slidingly engages recess 52 to enable pivot movements of coupler shaft 48 and pulley 42. A like ball 50' and guide recess 52' are provided for coupler shaft 48' for parallel movement with coupler shaft 48. As can be seen from FIGS. 1 and 2, the pulleys 38, 42, 42' are aligned along axis 36 to enable pivot movements of lever 24 to produce translation motions of platform 14.

Operation of manipulator 10 involves a pivot movement of control lever 24 in any desired direction. Housing 12 is provided with a truncated conical recess 56 having its apparent center below the crossing point of axes 36 and 40. The wall 58 of recess 56 serves as a stop for control lever 24. As shown in FIG. 2, the control lever 24 may be moved from one stop side at 60 to an opposite position at 62 corresponding to a pivot movement of about 70°. Since wall 58 is conical, a similar pivot range is provided in the opposite or transverse direction as shown in FIG. 3. The resulting translational motions of platform 14 are as illustrated by the phantom platform positions in FIGS. 2 and 4. Since coupler shafts 48 are of fixed length and sliding action is required between balls 50 and guide recesses 52, the latter are made sufficiently deep.

A control over the amount of motion of the platform within its plane is obtained by regulating the length of coupler shafts 48. Thus the distance between the crossing of axes 40', 36 and the point of contact of ball 50 with recess 52 may be selected to correspondingly determine the amount of motion of the platform 14 is response to pivot movement of lever 24.

Figure 6:
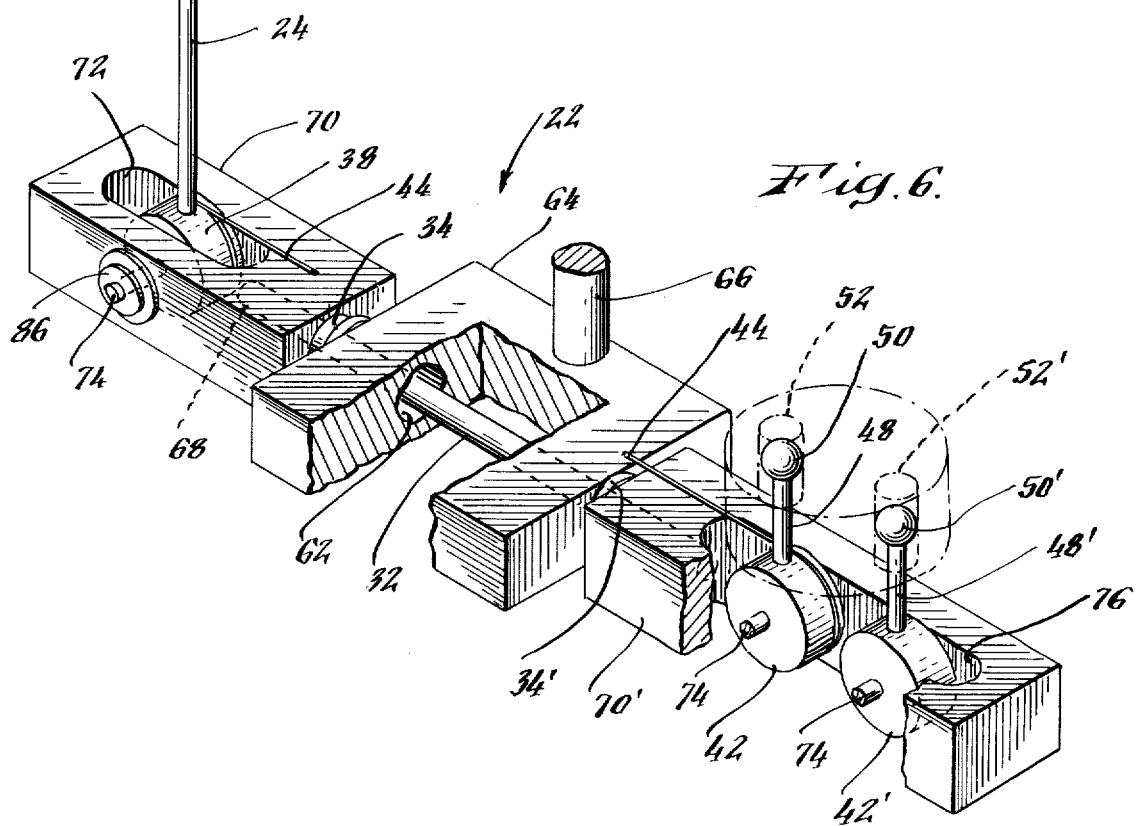
FIG. 6 is a perspective partially broken away view of segments of the manipulator shown in FIG. 1.

The simplicity and convenience of manipulator 10 in accordance with the invention may be appreciated with reference to the perspective view of actuator 22 in FIG. 6 and the section view of the manipulator 10 in FIG. 5. The actuator shaft 32 is mounted for rotation in bearings 34 which are held in a bore 62 of bracket 64 attached to housing 12 with bolts 66. The ends 68, 68' of actuator shaft 32 are respectively affixed to end located blocks 70, 70'. Control lever block 70 has a slot 72 sized to receive pulley 38 for rotational mounting to a bearing mounted shaft 74 which is coincident with axis 40.

Coupling block 70' is similarly shaped as block 70 but carries a slot 76 which is sufficiently large to accommodate both pulleys 42—42' in a mounting similar as for pulley 38. In order to provide low friction mounting, suitable bearings 74 may be employed with pulleys 38, 42 and 42'.

Blocks 70—70' contain low friction bearing mountings such as 78 for pulleys 38, 42, 42'. The bearing mountings are each located in a bore 80 sized to retain opposingly located flange-shaped bearings 82—82'. The bearings 82 receive a rotational shaft 74 which is attached to a pulley with suitable set screws (not shown). Spacers 84—84' and retainer rings 86—86' are employed to preload opposing bearings 82—82'.

Having thus described a manipulator in accordance with the invention, its advantages can be appreciated. A low friction facile control over the positions of a platform is obtained with an accuracy enabling the positioning of the platform with increments of a thousandth of an inch.

What is claimed is:

1. A manipulator for moving a platform in an accurate manner to desired positions in a plane comprising
a housing and a platform supported on the housing to enable movement of the platform in a plane;
an actuator mounted to the housing for rotation about an actuator axis which is generally parallel to the plane;
a control lever mounted to the actuator for pivot motion about a lever pivot axis which is generally transverse to the actuator axis;
coupling means mounted to the actuator with pivot movement about a coupler axis which is parallel to the lever pivot axis for effectively slidingly engaging the platform to drive it for movement in the plane in response to pivot motion of said means about the coupler axis and rotational movement of the actuator about its actuator axis; and
means mounted on the actuator for connecting the control lever to the coupling means to impart movement thereof about the coupler axis in response to control lever movement about its pivot axis,
whereby the platform responds with movement in the plane when the control lever is actuated to rotate the actuator or pivot the coupling means.

2. The manipulator as claimed in claim 1 wherein the connecting means is formed of
a pair of pulleys mounted to the actuator for rotation about the lever pivot axis and the coupler axis, said pulleys being respectively interposed between the actuator and the control lever and the actuator and the coupling means; and
a pulley cable operatively interconnecting the pulleys to enable lever pivot movement to produce corresponding pivot movement to the coupling means.

3. The manipulator as claimed in claim 2 wherein the coupling means is sized commensurate with the desired amount of platform movement in response to lever movement.

4. The manipulator as claimed in claim 3 wherein the coupling means further includes
a first coupler shaft connected to one of the pulleys and a second coupler shaft connected to the actuator for pivot movement about an axis parallel with the coupler axis, said first and second coupler shafts being aligned with each other parallel with actuator rotational axis; and
guide means attached to the platform to snugly slidingly receive ends of the coupler shaft to enable pivotal movement of the coupler shafts in response to lever actuations to drive the platform in said plane.

5. A manipulator for moving a platform in an accurate manner to desired positions in a plane comprising
a housing and a platform supported on the housing to enable translational movement of the platform in a plane;
bearing means mounted to the housing for defining an actuator axis of rotation generally parallel to the plane;
an actuator shaft mounted to the bearing means for rotation about the actuator axis;
a control lever mounted to the actuator shaft for rotation thereof about said actuator axis, said control lever further being mounted to the actuator for pivot movement along a pivot axis which is generally transverse to the actuator axis;

coupling means operative between the platform and the actuator shaft to transfer to the platform translational components of pivot movements about the actuator axis and a coupler axis which is generally parallel to the pivot axis of the control lever; and means mounted on the actuator shaft for transferring pivot movements of the control lever about its pivot axis to the coupling means to enable the coupling means to drive the platform in translation in said plane in response to control lever pivot movements.

6. The manipulator as claimed in claim 5 wherein the coupling means includes a coupler shaft mounted to the actuator for pivot movement about the coupler axis; and means for engaging the coupler shaft with the platform without permitting rotation thereof.

7. The manipulator as claimed in claim 6 wherein the engaging means further includes a second coupler shaft mounted on the actuator for parallel pivot movement with the first coupler shaft, both of said coupler shafts being provided with universal couplers interposed between the platform and the first and second coupler shafts, the universal coupler being selected to enable free sliding movement along a direction transverse to the plane while transferring translational components from the pivot motion of the actuator and the coupler shafts to the platform.

8. The manipulator as claimed in claim 5 wherein the platform is provided with guide means oriented transversely to the plane to inhibit rotation of the platform and wherein the coupling means further includes a coupler shaft mounted to the actuator for pivot movement about the coupler axis, said coupler shaft operatively engaging the guide means to transfer translational components of pivot movements of the control lever.

9. The manipulator as claimed in claim 8 wherein the coupler shaft is sized commensurate with the desired translational magnitude of the platform in response to pivot movements of the control lever.

10. The manipulator as claimed in claim 9 wherein the actuator shaft has a longitudinal shape with the control lever operatively engaging the actuator shaft near one end thereof and the coupler shaft operatively engaging the actuator shaft near the other end thereof.

11. The manipulator as claimed in claim 10 wherein the transferring means further includes a pair of pulleys mounted to the actuator for rotation about the coupler axis, one pulley being operatively interposed between the control lever and the actuator shaft and the other pulley being operatively interposed between the coupler shaft and the actuator shaft; and a cable interconnecting the pulleys for joint rotation.

12. A manipulator for moving a platform in an accurate manner to desired positions in a plane comprising a housing and a platform supported on the housing to enable translational movement of the platform in a plane;

a longitudinal actuator mounted to the housing for rotation about an actuator axis which is generally parallel to the plane;

coupling means mounted to the actuator for pivot movement about a coupler axis which is generally transverse to the actuator axis for effectively slidingly driving the platform for translational movement in the plane in response to pivot motion of said coupling means about the coupler axis and rotational movement of the actuator about its actuator axis;

a control lever mounted to the actuator for pivot motion about a lever pivot axis which is parallel to the coupler axis with said lever pivot axis, the coupler axis and the actuator axis being effectively coupled; and means for connecting the control lever to the coupling means to impart movement thereof about the coupler axis in response to control lever movement about the pivot axis, whereby the platform responds with translational movement in the plane when the control lever is actuated to rotate the actuator or pivot the coupling means.

13. The manipulator as claimed in claim 12 wherein the actuator further includes an actuator shaft;

a control lever block attached to one end of the actuator shaft and pivotly connected to the control lever; and a coupling block attached to the other end of the actuator shaft and pivotly connected to the coupling means.

14. The manipulator as claimed in claim 13 wherein the control lever block and the coupling block are each provided with slots oriented to respectively pivotly receive the control lever and the coupling means.

* * * * *

UNITED STATES PATENT OFFICE
CERTIFICATE OF CORRECTION

PATENT NO. : 3,938,402
DATED : February 17, 1976
INVENTOR(S) : Paul Citrin

It is certified that error appears in the above-identified patent and that said Letters Patent are hereby corrected as shown below:

Assignee: "Eastman Kodak Company, Rochester, New York" should be --Indicon Inc., Danbury, Connecticut--.

Attorney: "A.H. Rosenstein" should be --St. Onge, Mayers, Steward & Reens--.

Col. 2, line 62, "point" should be --pivot--.

Col. 3, line 37, "coresondingly" should be --correspondingly--;

Col. 3, line 38, "is" should be --in--.

Col. 4, line 39, "to" should be --of--.

Signed and Sealed this

Thirteenth Day of July 1976

[SEAL]

Attest:

RUTH C. MASON
Attesting Officer

C. MARSHALL DANN
Commissioner of Patents and Trademarks